(12) United States Patent
Xiong et al.

(10) Patent No.: US 10,143,933 B1
(45) Date of Patent: Dec. 4, 2018

(54) ROBOT

(71) Applicant: UBTECH Robotics Corp., Shenzhen (CN)

(72) Inventors: Youjun Xiong, Shenzhen (CN); Xiaopeng Wu, Shenzhen (CN); Xinpu Chen, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 11 days.

(21) Appl. No.: 15/663,704

(22) Filed: Jul. 29, 2017

(30) Foreign Application Priority Data

May 31, 2017 (CN) .......................... 2017 1 0399027

(51) Int. Cl.
*A63H 3/20* (2006.01)
*A63H 13/08* (2006.01)
*A63H 33/26* (2006.01)

(52) U.S. Cl.
CPC .............. *A63H 33/26* (2013.01); *A63H 3/20* (2013.01); *A63H 13/08* (2013.01)

(58) Field of Classification Search
CPC . A63H 3/00; A63H 3/20; A63H 13/02; A63H 13/04; A63H 13/08; A63H 13/10; A63H 33/26
See application file for complete search history.

(56) References Cited

U.S. PATENT DOCUMENTS

| | | | | |
|---|---|---|---|---|
| 1,694,976 A | * | 12/1928 | Gyger | A63H 13/02 446/309 |
| 2,134,974 A | * | 11/1938 | Hurwitz | A47F 8/00 223/78 |
| 2,633,669 A | * | 4/1953 | Par | A63H 13/04 15/103 |
| 2,910,804 A | * | 11/1959 | White | F41C 33/0263 2/300 |
| 2,957,693 A | * | 10/1960 | Ross | A63G 33/00 261/23.2 |
| 3,082,573 A | * | 3/1963 | Kantz | A63H 3/28 273/381 |
| 3,452,472 A | * | 7/1969 | Glass | A63H 3/46 446/336 |
| 3,978,611 A | * | 9/1976 | Strongin | A63H 3/28 446/298 |
| 4,750,900 A | * | 6/1988 | Hart | A63H 13/04 446/308 |
| 5,256,100 A | * | 10/1993 | Wang | A63H 33/30 42/58 |

(Continued)

*Primary Examiner* — Gene Kim
*Assistant Examiner* — Alyssa Hylinski

(57) ABSTRACT

A robot includes a body having a torso, a pair of arms and servos configured to drive the arms. A first end of each of the arms is movably connected to the torso via a corresponding one of the servos. An opposite, second end of each of the arms is connected with a hand. A first connection member is arranged on the body. A fake gun includes a second connection member that is magnetically attractable to the first connection member, and is connected to the body when the second connection member is attracted to the first connection member. One of the arms is rotatable and the hand of the one of the arms and the fake gun are configured in such a way that fake gun is detachably connected to the hand of the one of the arms when the one of the arms is rotated to a predetermined position.

8 Claims, 7 Drawing Sheets

(56) References Cited

U.S. PATENT DOCUMENTS

| | | | | |
|---|---|---|---|---|
| 5,362,271 | A * | 11/1994 | Butt | A63H 3/36 |
| | | | | 446/129 |
| 5,429,108 | A * | 7/1995 | Hsieh | F41B 11/641 |
| | | | | 124/56 |
| 5,746,602 | A * | 5/1998 | Kikinis | A63H 3/48 |
| | | | | 369/30.02 |
| 6,171,169 | B1 * | 1/2001 | Saunders | A63F 7/0612 |
| | | | | 446/137 |
| 7,537,506 | B2 * | 5/2009 | de la Torre | A63H 3/20 |
| | | | | 446/308 |
| 8,393,906 | B2 * | 3/2013 | Norman | A63H 3/04 |
| | | | | 439/38 |
| 9,061,217 | B2 * | 6/2015 | Strauss | F41B 3/03 |
| 2008/0026670 | A1 * | 1/2008 | de la Torre | A63H 3/20 |
| | | | | 446/353 |
| 2008/0229642 | A1 * | 9/2008 | Hu | F41B 11/64 |
| | | | | 42/54 |
| 2015/0059724 | A1 * | 3/2015 | Yang | F41B 11/646 |
| | | | | 124/66 |

* cited by examiner

ROBOT

CROSS REFERENCE TO RELATED APPLICATIONS

This application claims priority to Chinese Patent Application No. 201710399027.6, filed May 31, 2017, which is hereby incorporated by reference herein as if set forth in its entirety.

BACKGROUND

1. Technical Field

The present disclosure generally relates to robots, and particularly to a robot that can imitate human actions.

2. Description of Related Art

Robots can perform various actions by controlling servos at different joints. For example, some humanoid robots include arms that are rotatable with respect to the torso and perform some simple actions, such as arm swing. It is useful and desirable to provide a robot that can imitate more complicated human actions.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
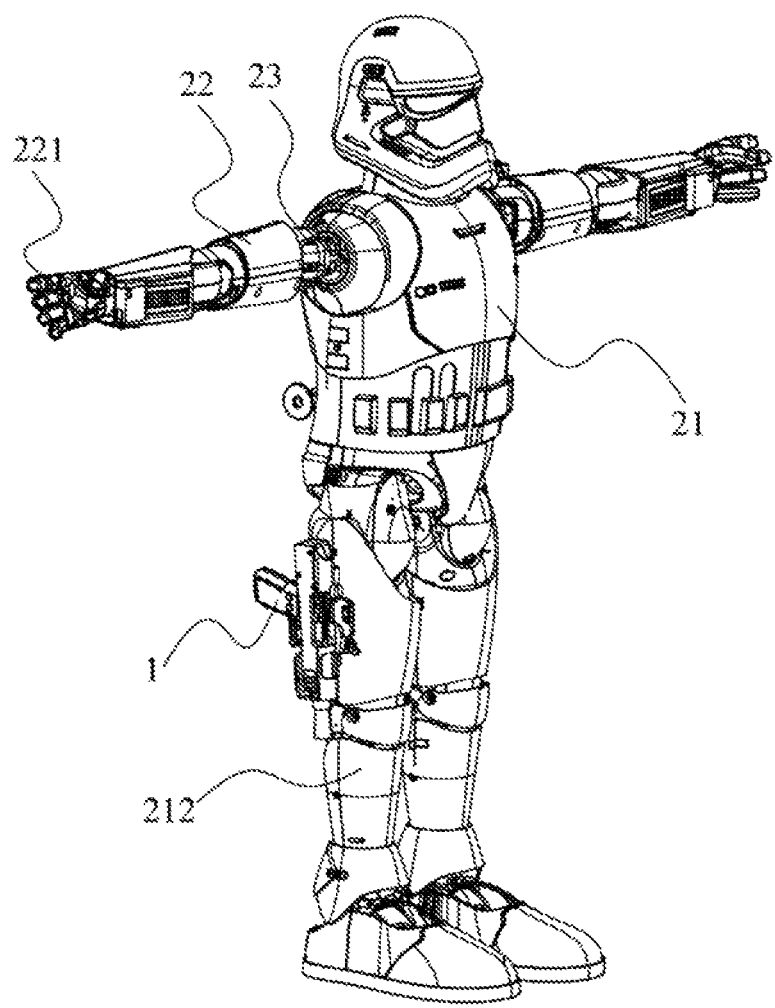
FIG. 1 is an isometric view of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
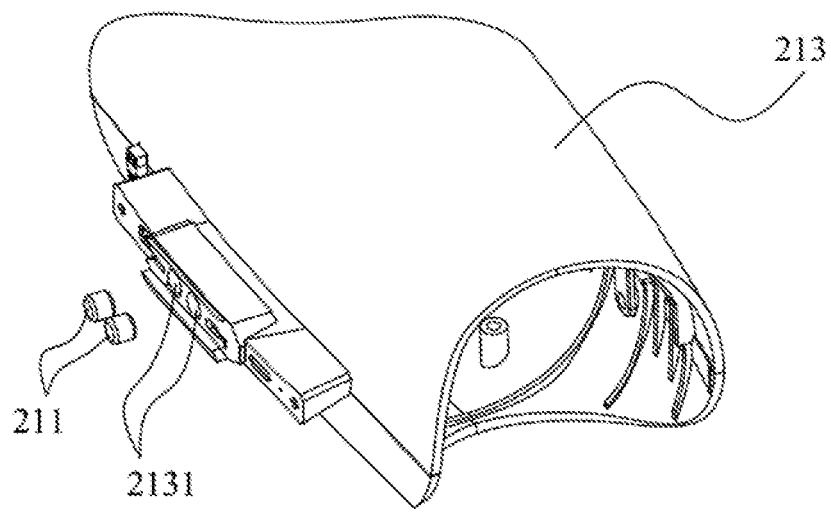
FIG. 2 is an isometric view of a holder for a fake gun of the robot of FIG. 1.
Figure 3:
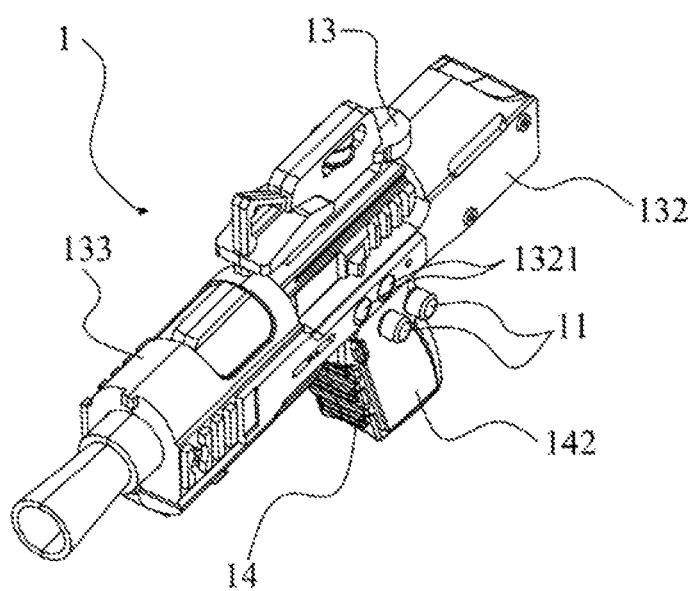
FIG. 3 is an isometric view of the fake gun of the robot of FIG. 1, with connection members detached from the fake gun.

Referring to FIGS. 1-3, a robot includes a body and a fake gun 1. The body includes a torso 21, a pair of arms 22 and servos 23 used to drive the arms 22. A first end of each of the arms 22 is movably connected to the torso 21 via a corresponding one of the servos 23. An opposite, second end of each of the arms is connected with a hand 221. A first connection member 211 is arranged on the body. The fake gun 1 includes a second connection member 11 that is magnetically attractable to the first connection member 211. The fake gun 1 is detachably connected to the body when the second connection member 11 is attracted to the first connection member 211. One of the arms 22 (hereinafter "right arm 22") is rotatable with respect to the torso 21 and the hand 221 (hereinafter "the right hand 221") of the right arm 22 and the fake gun 1 are configured in such a way that fake gun 1 connected to the body is detachably connected to the right hand 221 when the right arm 22 is rotated to a predetermined position. One of the servos 23 corresponding to the right arm 22 provides power that enables the right hand 221 to overcome the attraction force between the first connection member 211 and the second connection member 11, which allows the fake gun 1 to become disengaged from the first connection member 211 and move together with the right hand 221.

In the embodiment, the first connection member 211 and the second connection member 11 are magnets. In an alternative embodiment, one of the first connection member 211 and the second connection member 11 is a magnet, and the other one is made of ferromagnetic material. The body further includes a holder 213, and the first connection member 211 is fixed to the holder 213.

The right hand 221 includes a third connection member 2211, and the fake gun 1 includes a fourth connection member 12 that is magnetically attractable to the third connection member 2211. The third connection member 2211 is attracted to the fourth connection member 12 when the right hand 221 is rotated to the predetermined position.

In one embodiment, the attraction force between the first connection member 211 and the second connection member 11 is greater than the attraction force between the third connection member 2211 and the fourth connection member 12. When the fake gun 1 connected to the right hand 221 is rotated to the predetermined position, the fake gun 1 is connected to the holder 213 by the attraction force between the second connection member 11 and the first connection member 211. When it needs to return the fake gun 1 to the body, the right hand 221 and the fake gun 1 connected thereto are first moved to the predetermined position. The fake gun 1 is then connected to the body by the attraction force between the first connection member 211 and the second connection member 11. The right hand 221 is then moved back from the predetermined position. The attraction force between the first connection member 211 and the second connection member 11 and the attraction force between the third connection member 2211 and the fourth connection member 12 are both resistance forces that prevent the right hand 221 from moving away from the predetermined position. Since the attraction force between the first connection member 211 and the second connection member 11 is greater than the attraction force between the third connection member 2211 and the fourth connection member 12, the attraction force between the third connection member 2211 and the fourth connection member 12 is first overcome by the power provided by the servo 23 corresponding to the right arm 22, thereby allowing the fake gun 1 to become disengaged from the right hand 221.

In an alternative embodiment, the third connection member 2211 and the fourth connection member 12 may be omitted. In this case, the fake gun 1 needs to be removed from the right hand 221 manually and then placed onto the holder 213.

In an alternative embodiment, the attraction force between the first connection member 211 and the second connection member 11 may be smaller than or equal to the attraction force between the third connection member 2211 and the fourth connection member 12. In this case, the fake gun 1 needs to be removed from the right hand 221 manually and then placed onto the holder 213.

In the embodiment, the third connection member 2211 and the fourth connection member 12 are magnets. In an alternative embodiment, one of the third connection member 2211 and the fourth connection member 12 is a magnet, and the other one is made of ferromagnetic material.

In one embodiment, the fake gun 1 includes a barrel 13 and a grip 14. The second connection member 11 arranged at a side surface of the barrel 13, and the fourth connection member 12 is arranged at a side surface of the grip 14 which is opposite the side surface of the barrel 12.

Figure 4:
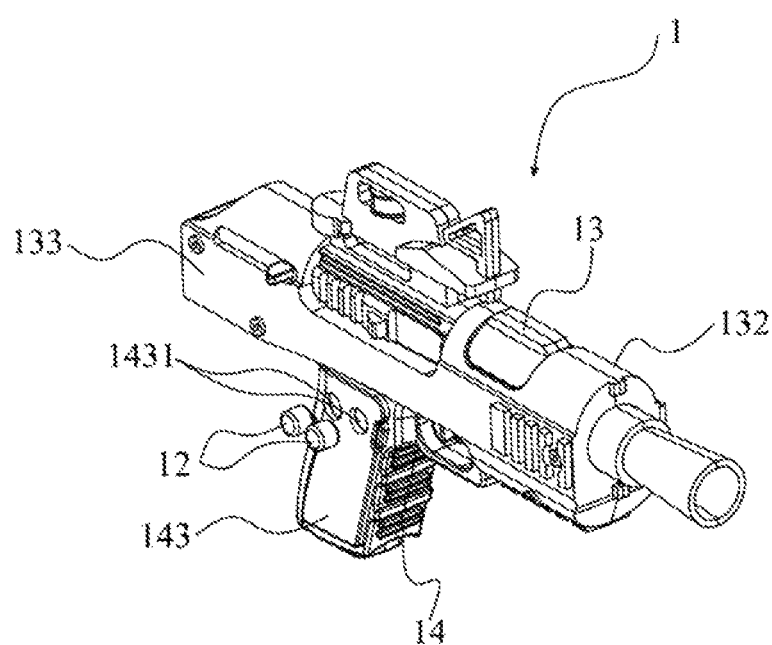
FIG. 4 an isometric view of the fake gun of the robot of FIG. 1, viewed from another perspective, with connection members detached from the fake gun.

Referring also to FIG. 4, the barrel 13 includes a main body 131, a first decoration plate 132 and a second decoration plate 133. The first decoration plate 132 and the second decoration plate 133 are arranged at opposite sides of the main body 131. The second connection member 11 is arranged at the first decoration plate 132. The grip 14 includes a main part 141, a first decoration panel 142 and a second decoration panel 143. The first decoration panel 142 and the second decoration panel 143 are arranged at opposite sides of the main part 141. The fourth connection member 12 is arranged at the second decoration panel 143. The main part 141 of the grip 14 is connected to or integrally formed with one end of the main body 131 of the barrel 13.

Figure 5:
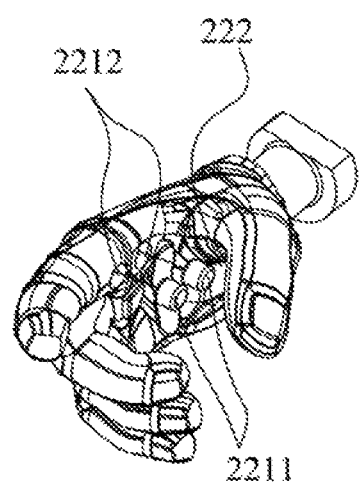
FIG. 5 is an isometric view of a hand of the robot of FIG. 1.

Referring also to FIG. 5, the right hand 221 includes five fingers that are shaped and formed similar to a human hand. The index finger is substantially straight and the rest of the fingers are bent, which corporately define a space 222 enabling the grip 14 to receive therein when the right hand 221 is rotated to the predetermined position. The third connection member 2211 is arranged at one side of the index finger and attracted to the fourth connection member 12 when the grip 14 is received in the space 222. When the right hand 221 is rotated away from the predetermined position, the grip 14 moves out of the space 222.

It is to be understood that the right hand 221 may be in other suitable gestures on condition that the fingers form the space 222 that allows the grip 14 to be received therein.

When the right hand 221 moves to the predetermined position, the grip 14 is fit into the space 222 and the third connection member 2211 is attracted to the fourth connection member 12. The right hand 221 is then moved upward and some of the fingers then apply a force to the grip 14 that can overcome the attraction force between the first connection member 211 and the second connection member 11, thereby allowing the shake gun 1 to move together with the right hand 221.

Figure 6:
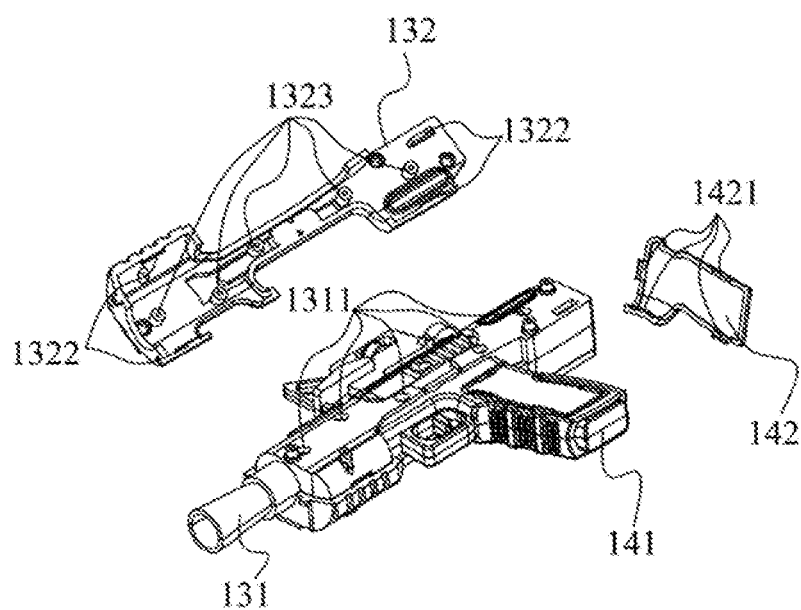
FIG. 6 is an isometric exploded view of the fake gun of the robot of FIG. 1.
Figure 7:
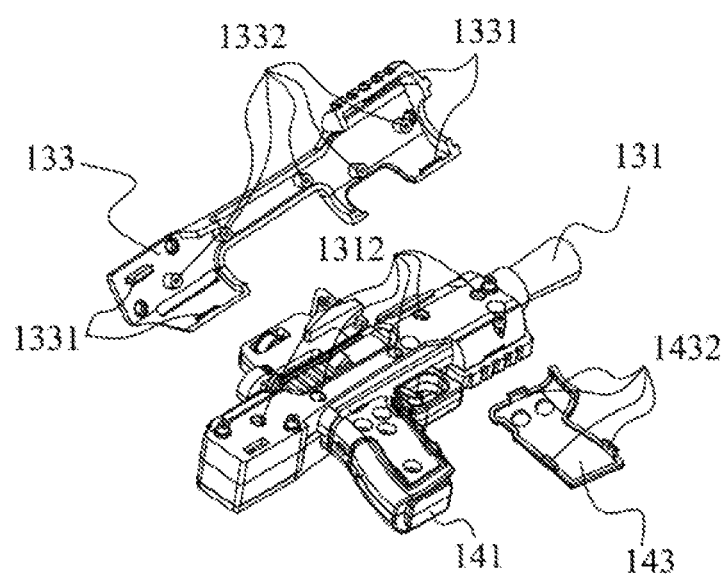
FIG. 7 is an isometric exploded view of the fake gun of the robot of FIG. 1, viewed from another perspective.

Referring also to FIGS. 6-7, the first decoration plate 132 of the barrel 13 defines a first mounting hole 1321 and the second connection member 11 is fit into the first mounting hole 1321. The second decoration panel 143 of the grip 14 defines a second mounting hole 1431, and the fourth connection member 12 is fit into the second mounting hole 1431. The lower ends of the torso 21 are connected with a pair of legs 212. The holder 213 is arranged on the right leg 212 (see FIG. 1). The first connection member 211 is received in the third mounting hole 2131. As shown in FIG. 5, the right hand 221 defines a fourth mounting hole 2212 for receiving the third connection member 2211 therein. The connection members can be held in position by glue.

In other embodiments, the holder 213 may be arranged at the waist of the robot or other suitable positions on condition that the fake gun 1 on the holder 213 can be reached by the right hand 221.

For the ease of disassembling, the first decoration plate 132 of the barrel 13 includes a first connecting portion 1322, the second decoration plate 133 includes a second connecting portion 1331. The first decoration plate 132 is connected to a side of the main body 131 via the first connecting portion 1322, and the second decoration plate 133 is connected to an opposite side of the main body 131 via the second connecting portion 1331. The first decoration panel 142 of the grip 14 includes a third connecting portion 1421, and the second decoration panel 143 includes a fourth connecting portion 1432. The first decoration panel 142 is connected to a side of the main part 141 via the third connecting portion 1421, and the second decoration panel 143 is connected to an opposite side of the main part 141 via the fourth connecting portion 1432. With such configuration, the first decoration plate 132, the second decoration plate 133, the first decoration panel 142 and the second decoration panel 143 can be fixed without using screws, which is conducive to cost saving.

The first decoration plate 132 includes a number of first positioning posts 1323 at an inner side thereof. The side of the main body 131 corresponding to the first decoration plate 132 defines a number of first positioning holes 1311 that are respectively arranged corresponding to the first positioning posts 1323. The first positioning posts 1323 are respectively fit into the first positioning holes 1311. The second decoration plate 133 includes a number of second positioning posts 1332 at an inner side thereof. The side of the main body 131 corresponding to the second decoration plate 132 defines a number of second positioning holes 1312 that are respectively arranged corresponding to the second positioning posts 1332. The second positioning posts 1332 are respectively fit into the second positioning holes 1312. With such configuration, the first decoration plate 132 and the second decoration plate 133 can be accurately positioned by the engagement of the first positioning posts 1323 and the first positioning holes 1311 and the engagement of the second positioning posts 1332 and the second positioning holes 1312.

In the present disclosure, the first connection member is arranged at the body of the robot and the fake gun includes a second connection member. The fake gun can be detachably connected to the body by the attraction force between the first connection member and the second connection member. The arms of the robot as driven by the servos are rotatable with respect to the torso. The fake gun can be reached by one hand of the robot. When the hand is moved to the position where the fake gun is located, the fake gun is received in the space defined by the fingers of the hand and can be connected to the hand by the connection members at the fake gun and the hand. The power provide by the corresponding servo enables some of the fingers to apply a force that can overcome the attraction force between the first connection member and the second connection member, allowing the fake gun to become disengaged from the body and move together with the hand. With such configuration, the robot of the present disclosure can imitate the human action of drawing a gun.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A robot, comprising:
a body comprising a torso, a pair of arms and servos configured to drive the arms, a first end of each of the arms being movably connected to the torso via a corresponding one of the servos, an opposite, second end of each of the arms being connected with a hand, a first connection member being arranged on the body; and
a fake gun comprising a second connection member that is magnetically attractable to the first connection member, the fake gun being detachably connected to the body when the second connection member is attracted to the first connection member;
wherein one of the arms is rotatable with respect to the torso and the hand of the one of the arms and the fake gun are configured such that the fake gun connected to the body is detachably connected to the hand of the one of the arms when the one of the arms is rotated to a predetermined position, and one of the servos corresponding to the one of the arms is configured to provide power that enables the hand of the one of the arms to overcome an attraction force between the first connection member and the second connection member, which allows the fake gun to become disengaged from the first connection member and move together with the hand of the one of the arms;
wherein the body further comprises a holder, and the first connection member is fixed to the holder;
wherein the hand of the one of the arms comprises a third connection member, the fake gun comprises a fourth connection member that is magnetically attractable to the third connection member, and the third connection member is attracted to the fourth connection member when the hand of the one of the arms is rotated to the predetermined position;
wherein the fake gun comprises a barrel and a grip, the second connection member is arranged at a side surface of the barrel, and the fourth connection member is arranged at a side surface of the grip which is opposite the side surface of the barrel; and
wherein the barrel comprises a main body, a first decoration plate and a second decoration plate, the first decoration plate and the second decoration plate are arranged at opposite sides of the main body, and the second connection member is arranged at the first decoration plate; the grip comprises a main part, a first decoration panel and a second decoration panel, the first decoration panel and the second decoration panel are arranged at opposite sides of the main part, and the fourth connection member is arranged at the second decoration panel; the main part of the grip is connected to or integrally formed with one end of the main body of the barrel.

2. The robot of claim 1, wherein the attraction force between the first connection member and the second connection member is greater than an attraction force between the third connection member and the fourth connection member, when the fake gun connected to the hand of the one of the arms is rotated to the predetermined position, the fake gun is connected to the holder by the attraction force between the second connection member and the first connection member, and the fake gun is disengaged from the hand of the one of the arms when the attraction force between the third connection member and the fourth connection member is overcome by the power provided by the one of the servos corresponding to the one of the arms.

3. The robot of claim 1, wherein one of the first connection member and the second connection member is a first magnet, the other one of the first connection member and the second connection member is a second magnet or made of ferromagnetic material, one of the third connection member and the fourth connection member is a third magnet, the other one of the third connection member and the fourth connection member is a fourth magnet or made of ferromagnetic material.

4. The robot of claim 1, wherein the hand of the one of the arms comprises a plurality of fingers that corporately define a space enabling the grip to receive therein when the hand of the one of the arms is rotated to the predetermined position, the third connection member is arranged at one of the fingers and attracted to the fourth connection member when the grip is received in the space.

5. The robot of claim 1, wherein the first decoration plate of the barrel defines a first mounting hole and the second connection member is fit into the first mounting hole, the second decoration panel of the grip defines a second mounting hole, and the fourth connection member is fit into the second mounting hole.

6. The robot of claim 4, wherein the first decoration plate comprises a first connecting portion, the second decoration plate comprises a second connecting portion, the first decoration plate is connected to a side of the main body via the first connecting portion, and the second decoration plate is connected to an opposite side of the main body via the second connecting portion; the first decoration panel comprises a third connecting portion, the second decoration panel comprises a fourth connecting portion, the first decoration panel is connected to a side of the main part via the third connecting portion, and the second decoration panel is connected to an opposite side of the main part via the fourth connecting portion.

7. The robot of claim 5, wherein the first decoration plate comprises a plurality of first positioning posts at an inner side thereof, the side of the main body corresponding to the first decoration plate defines a plurality of first positioning holes that are respectively arranged corresponding to the first positioning posts, and the first positioning posts are respectively fit into the first positioning holes; the second decoration plate comprises a plurality of second positioning posts at an inner side thereof, the side of the main body corresponding to the second decoration plate defines a plurality of second positioning holes that are respectively arranged corresponding to the second positioning posts, and the second positioning posts are respectively fit into the second positioning holes.

8. A robot comprising:
a body comprising a torso and an arm rotatably connected to the torso, the arm comprising a hand;
a fake gun magnetically and detachably connected to the body, wherein the arm and the fake gun are configured in such a way that the fake gun connected to the body is magnetically and detachably connected to the hand when the arm is rotated to a predetermined position, and the hand drives the fake gun to become disengaged from the body and move together with the hand;
wherein the fake gun comprises a barrel, a grip and two connection members that are respectively attractable to the body and the hand, the barrel comprises a main body, a first decoration plate and a second decoration plate, the first decoration plate and the second decoration plate are arranged at opposite sides of the main body, and one of the connection members is arranged at the first decoration plate; the grip comprises a main part, a first decoration panel and a second decoration panel, the first decoration panel and the second decoration panel are arranged at opposite sides of the main part, and the other one of the connection members is arranged at the second decoration panel; the main part of the grip is connected to or integrally formed with one end of the main body of the barrel.

\* \* \* \* \*